Aug. 30, 1938. R. L. TWEEDALE 2,128,720
REFRIGERATING APPARATUS
Filed Jan. 31, 1935
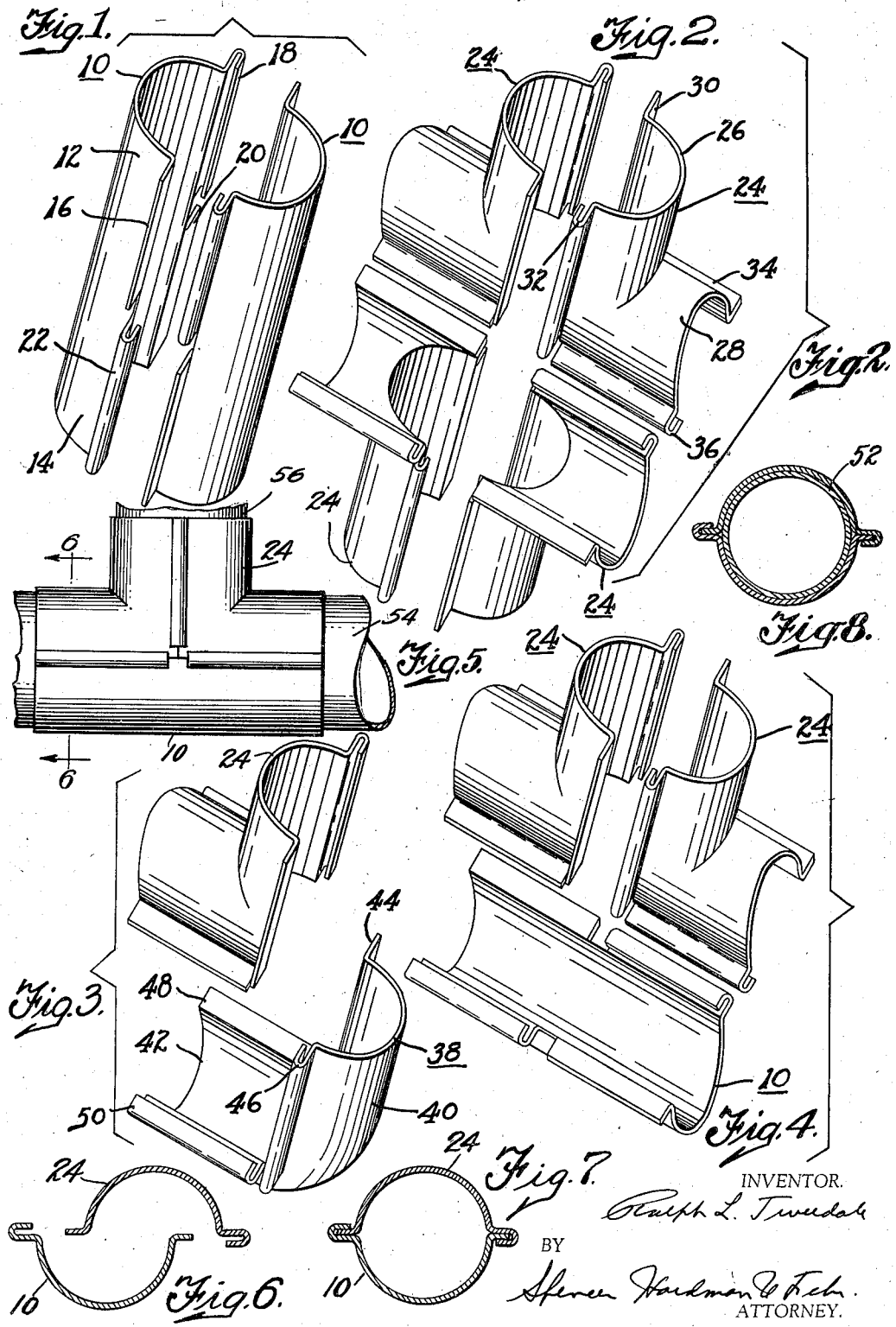
INVENTOR.
Ralph L. Tweedale
BY
Sheveen Hardman & Fitch.
ATTORNEY.

Patented Aug. 30, 1938

2,128,720

UNITED STATES PATENT OFFICE 2,128,720

REFRIGERATING APPARATUS

Ralph L. Tweedale, Dayton, Ohio, assignor to General Motors Corporation, Dayton, Ohio, a corporation of Delaware Application January 31, 1935, Serial No. 4,250

3 Claims. (Cl. 285—210)

This invention relates to connectors and more particularly to that class of connectors used for securing together the ends of two or more sections of conduit. While not limited to any particular field, the invention is well suited for use in connecting together pieces of piping or conduit of the type comprising seamless drawn copper tubing.

It is an object of the present invention to provide connecting means for connecting a plurality of ends of conduit, which connecting means is formed from a plurality of formed metal parts which may be assembled together at the time of assembly to the piping and may be finally secured together and to the piping by a sealing medium.

Another object is to provide connecting means for conduits by which each of a number of parts may be used in more than one type of connecting means, that is, to provide a system of connectors by which the number of types of connectors which it is possible to assemble is greater than the number of pieces of different shape which it is necessary to carry in stock.

Further objects and advantages of the present invention will be apparent from the following description, reference being had to the accompanying drawing, wherein a preferred form of the present invention is clearly shown.

In the drawing:

Fig. 1 represents a perspective view of a pipe coupling embodying one form of the present invention, the parts being shown in disassembled relation;

Fig. 2 is a perspective view of a cross embodying one form of the present invention, the parts being shown in disassembled relation;

Fig. 3 is a perspective view of an elbow embodying one form of the present invention, the parts being shown in disassembled relation;

Fig. 4 is a perspective view of a T embodying one form of the present invention, the parts being shown in disassembled relation;

Fig. 5 represents a side view of a T embodying one form of the present invention showing the parts of the T assembled together and to a plurality of conduits;

Fig. 6 is a cross section on line 6—6 of Fig. 5 showing the first step in assembling the parts of the fitting;

Fig. 7 is a cross section on line 6—6 of Fig. 5 showing the parts after the second step of assembly; and Fig. 8 is a cross section on line 6—6 of Fig. 5 showing the parts after the third step of assembly.

Heretofore, in the art of connecting together conduits and similar structures, it has been customary to form fitting members such as couplings, crosses, elbows and T's into their finished form at the time of manufacture and to subsequently assemble them to the pipes or conduits in any of various ways. This has necessitated large stocks of fittings of various form and size to be carried by plumbing supply houses and others, as well as by the workmen who assemble the piping together on the job. According to the present invention, the number of different pieces which it is necessary for supply houses to stock and for workmen to carry about on the job is reduced by providing a system of connectors for pipe fitting which are not assembled to form a complete fitting until final assembly of the fitting to the pipe. The parts of the fittings are arranged so that one style of part may be used in several styles of fitting. In order to facilitate assembly, the fitting parts are preferably provided with inter-engaging means by which they may be readily assembled before being connected to the pipe, but arranged so that when assembled together and then assembled to the pipe they will be mechanically locked together so that the necessity of holding the parts of the fitting together during the operation of sealing is avoided. The fitting parts are preferably sealed together and to the pipe upon which they are assembled by a plastic sealing medium, for example, solder, so that when finally sealed, a fluid tight junction between the various pipes being connected and the various parts of the fitting is secured.

Referring now to Figs. 1 through 4, wherein one form of the invention is illustrated, there is shown in Fig. 1 two identical parts 10 which may be assembled together to form a straight line coupling. Each of these parts comprises two semi-cylindrical pipe engaging portions 12 and 14 which are really a continuation of each other. At either side of the semi-cylindrical portion 12 there is provided seam forming means which preferably comprise a straight flange 16 and a reversely bent flange 18 at the opposite side. Corresponding seam forming means 20 and 22 are formed at the sides of the pipe engaging portion 14 but are arranged reversely to the seam forming means 16 and 18 as shown in the drawing. In Fig. 2 there is shown a plurality of identical pipe fitting parts 24 which may be assembled together to form a cross as shown. Each part 24 is formed with semi-cylindrical pipe engaging portions 26 and 28 having seam forming means 30, 32, 34 and 36 similar to the seam forming means 16, 18, 20 and 22 respectively. The reversely bent flanges 32 and 36 are, however, located along the same side of the semi-cylindrical portions 26 and 28 respectively. Referring now to Fig. 3, there is shown a part 38 which may be assembled to a part 24 to provide an elbow. The part 38 comprises two semi-cylindrical pipe engaging portions 40 and 42 formed with corresponding seam forming means 44, 46, 48 and 50 arranged to interfit with the seam forming means on the part 24. Fig. 4 illustrates the manner of arranging two of the pipe fitting parts 24 with one of the pipe fitting parts 10 in order to form a T. The method of assembling the fitting parts together and to the pipes which they are to connect, is illustrated in Figs. 6 to 8 wherein it will be seen that the two parts 24 and 10 are moved relative to each other along the plane of division between them until the parts are brought to the position of Fig. 7. With the parts held in this position the fitting is telescoped onto the end of a pipe 52 which prevents disassembly of the pieces 10 and 24 in the manner opposite to that in which they were assembled. Each of the other fittings shown in Figs. 1 to 3 are assembled in substantially the same manner, it being noted that the coupling of Fig. 1 must be assembled by a sort of twisting motion about an axis perpendicular to the division plane.

Referring to Fig. 5, two parts 24 and one part 10 may be assembled in this manner to each other and to the pipe conduits 52, 54 and 56 to provide a T connection between the three pipes. It will be seen that the pipes hold the fitting parts in assembled relation without requiring clamps or other holding means to be provided. While the parts are in this position, heat is applied to them and solder fed into the joining surfaces of all the parts. Suitable feeding holes (not shown) may be provided for feeding solder to the joints to be sealed if desired. When sufficient solder has been drawn into the joints of the fitting by capillary attraction, the feeding of solder is stopped and the source of heat removed. When the joint then becomes cooled, a fluid tight connection is provided.

It will thus be seen that the forms of the invention described provide for the assembly of different fittings from a minimum of parts for any one pipe size. Thus, the number of different style of parts which it is necessary to manufacture, stock and carry about on a job is reduced by 25%.

While it is preferred to form the fitting parts of sheet metal by stamping, it will be clear that they may be formed in other ways as by forging, casting, etc. Likewise, while the system has been described in connection with its application to connecting drawn copper tubing, its application to the connection of other forms of conduits or solid parts will be obvious. In addition, many advantages of the invention may be derived from fittings made in accordance with these teachings but which may have their parts assembled together and suitably sealed before the parts are assembled to the conduits. While the invention has been illustrated as applied to fittings having outlets arranged at 90° or multiples thereof to each other, it is equally applicable to fittings having their outlets arranged at other angles, for example, 45° or multiples thereof.

While the form of embodiment of the present invention as herein disclosed constitutes a preferred form, it is to be understood that other forms might be adopted, all coming within the scope of the claims which follow.

What is claimed is as follows:

1. A fluid tight pipe fitting having three or more parts of substantially semi-circular cross-section and joinable together to form three or more cylindrical pipe engaging portions each adapted to receive a pipe of a closed fluid conveying system, each of said parts having interfitting portions for locking said parts together when assembled to receive the pipes of the system during the operation of sealing the fitting parts together and to the pipes of the system, said interfitting portions comprising a radial flange on one part and a reversely bent radial flange on another part adapted to permit assembly of the parts upon the pipes of the system by sliding the radial flange into the reversely bent radial flange whereby said reversely bent radial flange overlaps the first flange.

2. A fluid tight pipe fitting having three or more substantially cylindrical pipe engaging portions each adapted to receive the end of a pipe of a closed fluid conveying system comprising, three or more sheet metal parts of semi-circular cross-section joinable along one or more planes of the axis of the cylindrical portions of said fitting, each of said parts having interfitting portions for locking said parts together when assembled to receive the ends of the pipes of the system during the operation of sealing the fitting parts together and to the pipes of the system, said interfitting portions comprising a radial flange on one part and a reversely bent radial flange on another part, said radial flange and said reversely bent radial flange permitting assembly of the parts upon the pipes of the system by sliding the radial flange into the reversely bent radial flange whereby said reversely bent flange overlaps the first flange.

3. A fluid-tight pipe fitting having a plurality of parts of substantially semi-circular cross-section and joinable together to form a plurality of cylindrical pipe engaging portions each adapted to receive a pipe of a closed fluid conveying system, each of said parts having interfitting portions for locking said parts together when assembled over the pipes of the system during the operation of sealing the fitting parts together and to the pipes of the system, and each of said parts comprising a radial flange and a reversely bent radial flange adapted to permit assembly of the parts upon the pipes of the system by sliding the radial flanges thereof into the reversely bent radial flanges whereby said reversely bent radial flanges overlap said radial flanges.

RALPH L. TWEEDALE.